Figure 1:
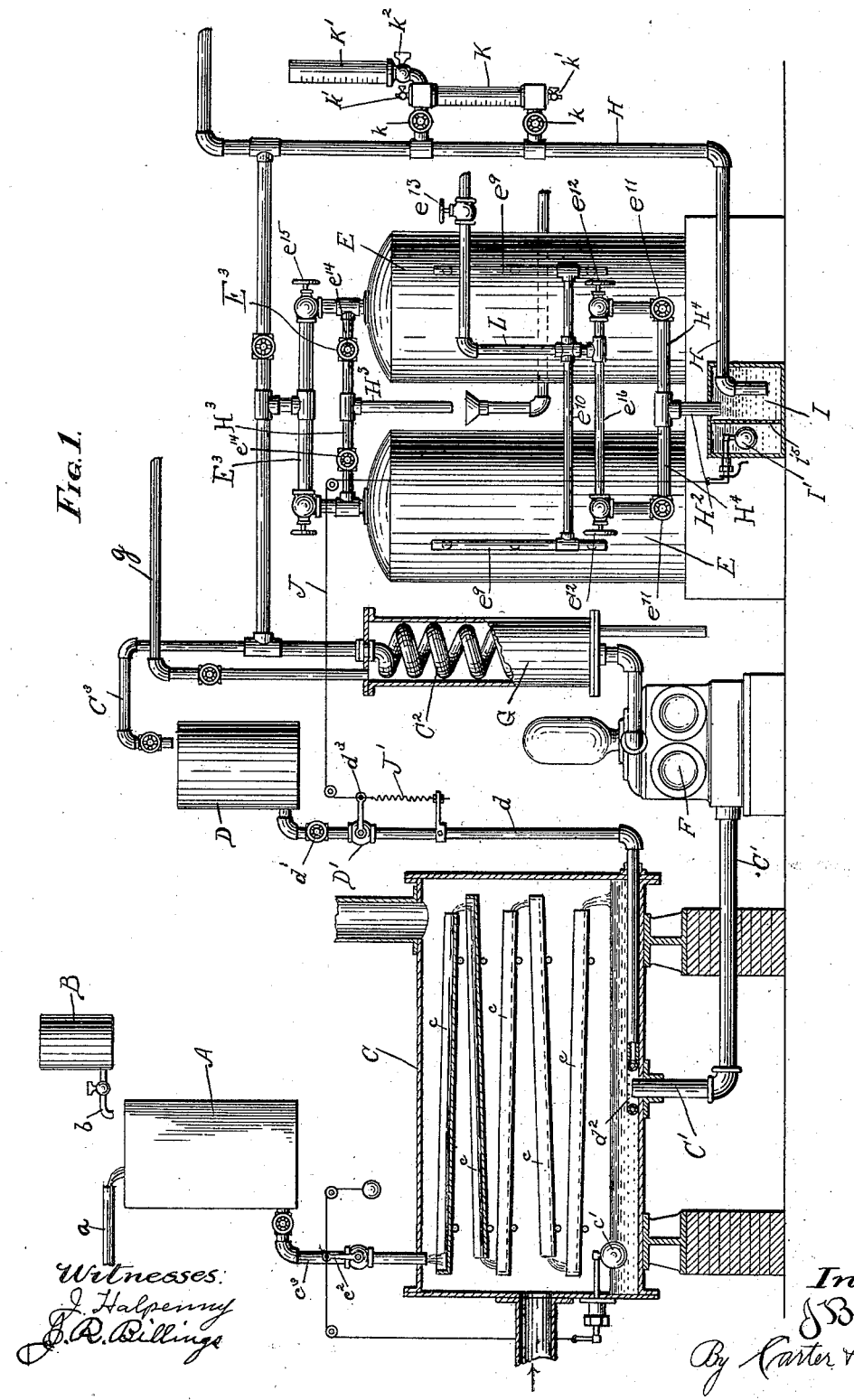

No. 646,931. Patented Apr. 3, 1900.
J. B. GREER.
APPARATUS FOR PURIFYING WATER.
(Application filed May 15, 1899.)
(No Model.) 2 Sheets—Sheet 1.

Witnesses:
J. Halpenny
J. R. Billings

Inventor
J B Greer
By Carter & Graves
Attys

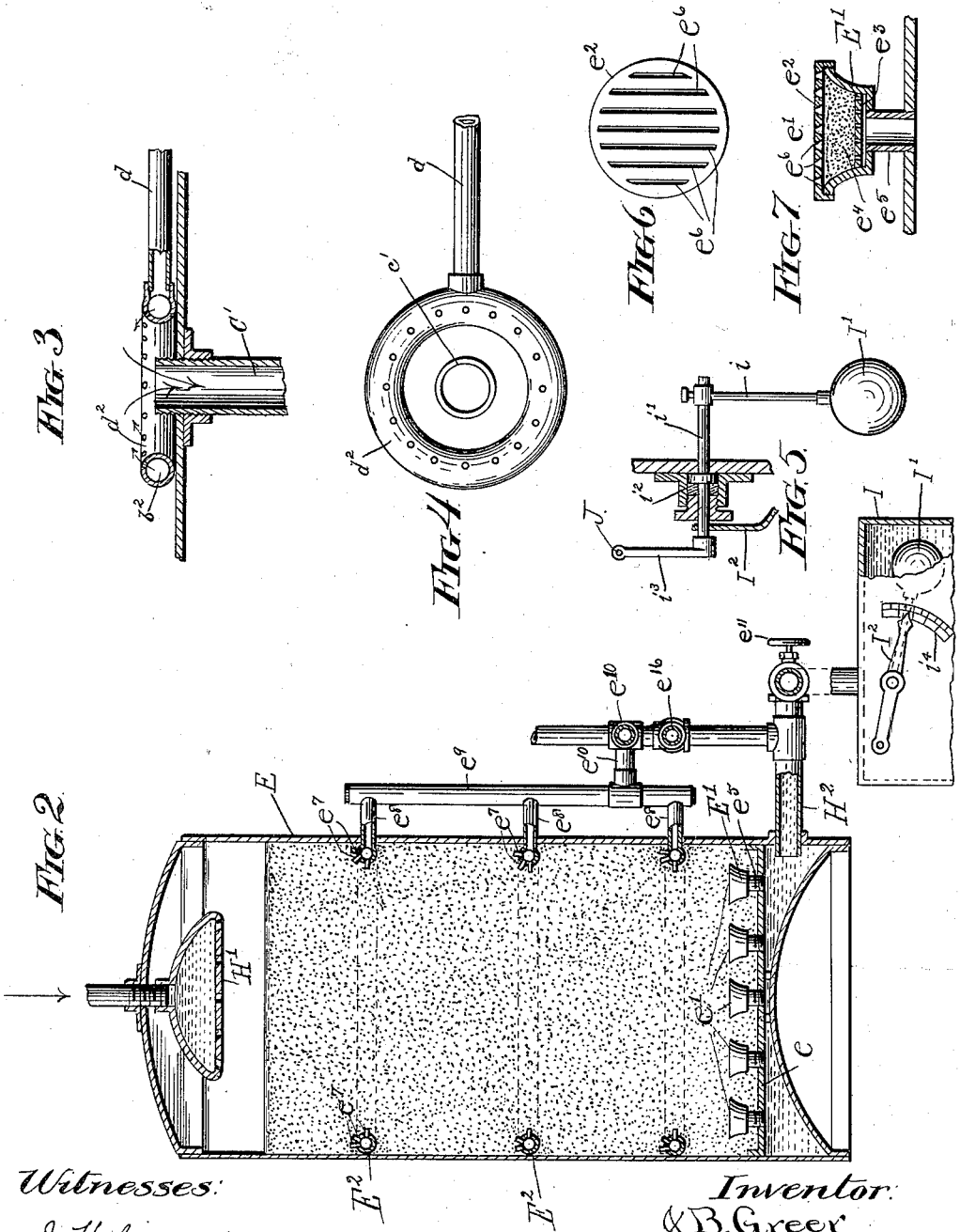

UNITED STATES PATENT OFFICE.

JAMES BOYD GREER, OF CHICAGO, ILLINOIS.

APPARATUS FOR PURIFYING WATER.

SPECIFICATION forming part of Letters Patent No. 646,931, dated April 3, 1900.

Application filed May 15, 1899. Serial No. 716,904. (No model.)

*To all whom it may concern:*

Be it known that I, JAMES BOYD GREER, of Chicago, in the county of Cook and State of Illinois, have invented certain new and useful Improvements in Processes of and Apparatus for Purifying Water, of which the following is a specification.

This invention relates to an improved apparatus for use in the purification of water for mechanical purposes, and particularly for use in steam-boilers.

It is well known that nearly all waters found in nature are more or less impure and contain many substances which if allowed to enter the boiler interfere greatly with the economical generation of steam and are destructive to the apparatus. Such impurities may for present purposes be classed under three general heads—first, scale-forming substances, among which may be mentioned the carbonates, sulphates, and nitrates of calcium and magnesium, silica, alumina, oxide of iron, &c.; second, corrosive substances, which attack the metal of the boiler and piping, causing "pitting" or "honeycombing" and tending to dangerously weaken their structure, and among these are free acids, the sulphates of iron and aluminium, the chlorides of calcium and magnesium, &c.; third, substances which tend to cause foaming and priming in the boiler and which include, among other things, the carbonate and sulphate of sodium, the chlorides of sodium, calcium, and magnesium, and various vegetable and organic impurities.

The principal object of the invention is to provide an economical and efficient apparatus for disposing of or neutralizing such impurities in feed-water before it enters the boiler, and thus to prevent their interfering with the economical generation of steam or the durability of the structure; and the invention consists in the matters herein set forth, and particularly pointed out in the appended claims.

In my improved apparatus the free acid or other corrosive substance present in the water is first neutralized by the introduction of a suitable reagent—such as a hydrate of lime, soda-ash, or analogous substances—at a point as near the source of supply as is practicable, so as to relieve the pipes and other apparatus from its corroding action at the earliest possible moment. If no corrosive agent is present in the water, this step will of course be omitted. The water thus neutralized (or originally free from corrosive properties) is then heated and such impurities as are precipitated by heat alone are allowed to be deposited. The impurities remaining in solution are then precipitated by the introduction of a suitable reagent, which, if the impurities are of a scale-forming class, may be a solution of carbonate of soda or soda-ash or of trisodium or di-sodium phosphate or sodium hydrate or any other chemical reagent capable of precipitating the particular scale-forming substance present or which, in the case of alkaline impurities, may be a nitrate of silver or lead, barium chloride, tannic acid, or other chemical capable of precipitating the particular alkali present. By this treatment the impurities previously held in solution will be changed to solids held in suspension in a light flocculent form capable of being entirely separated out and removed by a filtration, which forms the last step in the process and which leaves the water perfectly clear and in such a condition of purity that it may be fed into the boiler and efficiently used for steam generation without increasing the fuel consumption or deleteriously affecting the structure of the boiler. The entire process will furthermore be understood as carried on continuously during the flow of the water from the point of supply to the boiler, and the necessary reagents for precipitating the impurities are introduced in liquid form and in such manner that their amount can be varied from time to time as tests may show to be necessary to complete purification without waste of chemicals without in any way interrupting the continuity of the process.

In carrying out my improved process thus generally set forth I employ an improved apparatus, one form of which is hereinafter more fully described in connection with the accompanying drawings, in which—

Figure 1 is a general view, in side elevation, of a water-purifying apparatus constructed in accordance with my invention. Fig. 2 is a sectional detail of the filter employed. Fig. 3 is a sectional detail showing the manner in which the chemical reagent is supplied to the heater around the outlet-pipe. Fig. 4 is a top plan view thereof. Fig. 5 is a sectional detail of the float device which automatically regulates the flow of the reagent in accordance with the specific gravity of the water as it leaves the filter. Fig. 6 is a top plan detail of one of the strainer-heads used in the filter. Fig. 7 is a sectional side elevation thereof.

Referring to said drawings, A designates a tank, which is supplied with feed-water through a pipe $a$ or otherwise. Adjacent to this tank is a small tank B, which in case the water contains free acid or other corrosive properties will be supplied with a neutralizing reagent, such as a solution of lime or soda-ash or the like. The tank is provided with an outlet valve or cock $b$, by which the flow of the reagent into the tank A will be regulated in accordance with the flow of the feed-water. From the tank A the feed-water is conducted by the force of gravity or by any suitable pumping machinery (not herein illustrated) to a heater C, which is desirably and herein shown as made in the form of what is known as an "open" heater or one in which the entering feed-water is allowed to flow slowly over a series of wide shallow pans $c$ and subjected in the meantime to the heating action of a current of steam passed through the heater and usually supplied from the exhaust of an engine. This form of heater is particularly advantageous for use in connection with the purification of feed-water that contains carbonate of lime, which as the water is heated will be deposited to a considerable degree on the pans of the heater and to this extent will not require chemical treatment. With this form of heater it is obviously necessary to prevent the heater from being flooded, and for this reason the supply of feed-water to the heater is regulated by means of a float $c'$, which is connected with a valve $c^2$ in the supply-pipe $c^3$, leading to the heater, so that when the water in the bottom of the heater rises beyond a certain predetermined depth said valve will tend to reduce or cut off the supply. It will, however, be understood that neither this device nor the heater itself is of my invention, both being old, *per se*, and well known to those familiar with this art.

Adjacent to the heater C is a tank D for containing a suitable reagent to precipitate such impurities as are not thrown down by the mere heating of the water. In the case of scale-forming impurities this reagent may be, for example, tri-sodium or di-sodium phosphate or soda-ash or the like, or in the case of alkaline impurities it may be nitrate of silver or lead or barium chloride or other reagents suitable for this purpose. A pipe $d$, controlled by a valve $d'$, leads from this tank into the lower part of the heater, and to insure the complete impregnation of the water by the reagent the pipe $d$ is shown as discharging at a point close to the outlet-pipe $C'$ of the heater and, desirably, as terminating in a ring $d^2$, which is perforated on its upper inner surface, so that the reagent will be diffused thoroughly in the outflowing current of water. The outlet-pipe $C'$ leads from the heater to a filtering apparatus E, which in this instance is what is known as a "pressure-filter," the pressure being herein shown as supplied by a pump F, connected in the line between the heater and filter. Provision is also made for reheating the feed-water before it reaches the filter in cases where the character of the water is such as to render this additional treatment desirable. This provision consists, as herein shown, in a steam-jacket G, which incloses a portion of the pipe $C'$ and is supplied with live steam through a pipe $g$, that portion of the pipe $C'$ within the jacket being desirably made in the form of a copper coil $C^2$, so as to render the reheating action of the live steam as effective as possible. This reheating of the water serves to greatly hasten the chemical action of the ingredients introduced from tank D and insures a complete precipitation before the water enters the filter. This reheater is desirable not only because of the advantage resulting from the fact that the water is brought to a proper temperature for introduction into the boiler, but also by reason of the fact that it so hastens the chemicals in their reactions that a considerable saving in space is effected, the space for the location of the apparatus being in many instances exceedingly limited. A pipe $C^3$ may be led out of the pipe $C'$ to the tank D to supply hot water for dissolving the reagent placed in said tank.

From the filter E the water is conducted off to the boiler or other desired point of discharge through a pipe H, and the water in this pipe should be practically pure considered with reference to its use in steam-boilers if the process has been properly carried on and the chemical solution supplied to the amount necessary to fully precipitate the impurities and enable them to be all filtered out. To automatically insure the exact working of the apparatus in this respect, I have as a further improvement introduced at a suitable point, desirably in the outlet-pipe H, a regulator I, by which the flow of reagent from the tank D will be governed in accordance with the specific gravity of the water coming from the filter. As herein shown, this regulator consists of a chamber or casing connected in the line of the discharge-pipe and containing a float $I'$, secured to the end of the radial arm $i$, which is attached to the shaft $i'$, that projects out through a stuffing-box $i^2$ and has a second radial arm $i^3$ secured to its outer end. A cord J is attached to the end of this latter arm and is conducted over suitable guide-pulleys and attached to its other end to the lever $d^3$ of a valve $D'$ in the outlet-pipe $d$ of the tank D, the pull exerted on this valve-lever by the cord J being opposed by a yielding resistance, such as the spring $J'$, so that as the tension on the cord is varied the position of the valve-lever, and consequently the amount of valve-opening, will be varied correspondingly. The operation of this regulator depends upon the fact that the specific gravity of the water increases with the amount of impurities held in solution, so that if precipitation has not been secured to the requisite degree the specific gravity of the water leaving the filter will be greater than it should be with a corresponding increase in the buoyancy of the float and with a consequent variation in the tension on the cord $J'$. As the specific gravity of the water increases the valve $D'$ will be opened to admit an increased supply of reagent to the heater, and thus increase the precipitation to the amount necessary to bring the water to the desired degree of purity. A pointer $I^2$, secured to the shaft $i'$ and reading against a graduating-scale $i^4$, is also provided to enable the attendant to readily note the condition of the water at any time. A perforated diaphram $i^5$ in the regulator-casing separates the float from the main circuit of the discharge and prevents its being influenced by such current, while permitting the changes in the specific gravity of the water.

Provision is also herein shown for chemically determining the condition of the water, as follows: K designates a glass connected at its upper and lower ends with the discharge-pipe H and provided with valves $k$, by which it can be completely cut off from the latter, and also with cocks $k'$, that enable the water remaining in the tube when it is so cut off from the discharge-pipe to be drawn down to any desired extent. A burette or graduated tube $K'$ for holding a standard solution of the precipitating reagent is connected with the tube K, at the upper end of the latter, and a cock $k^2$ is inserted in the connection, so that any desired amount of the solution in the burette may be allowed to flow through said tube K. When it is desired to test the condition of the water passing in the discharge-pipe, the valves $k$ are closed and the water confined in the glass tube K drawn by opening the cock $k^2$ until a known quantity remains, as may be determined by graduations or the like on the glass. A little of the standard solution is then allowed to flow into the tube K from the burette and will cause an immediate precipitation if the water is still impure. When this precipitation has settled, leaving the water clear again, a little more of the standard solution is introduced, and if the water is still impure will cause a further precipitation, which is again allowed to settle, and this operation is repeated until no further precipitation occurs. The total quantity of the solution thus found necessary to complete the precipitation of the impurities in the known quantity of water contained in the tube K will then indicate the amount or number of grains of impurities per liter or gallon still held in solution in the water and will consequently apprise the attendant as to whether and how much to increase the quantity or strength of the precipitating reagent supplied through tank D.

The filter shown herein as constituting a part of the apparatus for carrying out my process embodies certain features of novelty, which are made the subject of claims.

Referring to Figs. 2, et seq., the filter-receptacle is shown as preferably made in the form of an upright cylinder E, at the upper end of which the inlet-pipe H enters and terminates at a short distance within the filter-body in a distributing or spraying nozzle $H'$. Near the lower end of the filter-body the latter is provided with a horizontal partition $e$, within which are seated a plurality of drain-nozzles $e'$, forming outlet-passages for the passage of the water from the filter-bed to the space beneath the partition. The drain-nozzles $e'$ are of novel construction, each consisting of a hollow body $E'$, (of inverted-bell shape, preferably,) provided with a removable end cap $e^2$, apertured to permit the ingress of water, a diaphragm $e^3$, perforated to permit the escape of water, a filling of filtering material $e^4$ between the end cap and diaphragm, and a tubular stem or standard $e^5$, connected with the lower side of the body, so as to communicate with its interior and seated at its lower end in an aperture in the partition $e$. The apertures in the end cap $e^2$ have the form of narrow slits $e^6$, which increase in width or are of increasing cross-sectional area from the upper surface of the cap downwardly through the latter, so that any grains of filtering material which are small enough to enter the slits will drop through into the body of the nozzle and not lodge within the slits to obstruct the passage of water therethrough. The discharge-pipe $H^2$ of the filter communicates with the space below the partition $e$, while the bed of filtering material occupies the principal part of the space above the partition, as shown clearly in the drawings. When, as shown in the present instance, a pair of filters are connected in parallel, the said branch pipes will be united to provide a cross connection extending between the inlet-pipes. By reason of the peculiar interconnection between the two filters coöperating with the supply-pipes $E^3$ and outlet-pipes $H^4$ another and important advantage results— namely, the possibility of washing out the filter-bed of either filter with filtered water from the other, and this without interrupting the operation of supplying water to the boiler or other point of consumption, thus rendering the plant independent of an outside supply introduced through the pipe L or its equivalent. Such washing operation may be performed as follows: Assuming that it is desired to wash out the right-hand filter of the pair, the operator will first throw it out of operation by closing the cock $e^{15}$, controlling its inlet, and the cock $e^{11}$, controlling its outlet. If now the cock $e^{14}$, controlling the branch outlet $H^3$ at the upper end of said filter, be opened, so as to permit the water to flow through it in the reverse direction and escape through the pipe $H^3$, the water from the left-hand filter will enter it through the interconnecting pipe $e^{16}$ and thence by way of the pipes $e^{10}$ and $H^2$ through both the agitating-nozzles $e^7$ and the drain-nozzles $e'$. Obviously by adjusting the cocks $e^{11}$ $e^{12}$ of the left-hand filter the proportion of water which is thrown through the right-hand filter and that permitted to pass on by the main outlet may be determined at will. It will be further obvious that the left-hand filter may be cleansed in exactly the same manner by simply reversing the order of opening and closing the several cocks. By thus providing valved cross connections between the two filtering vessels it will be observed that the hot chemically-treated water of either vessel may be employed to wash out the other vessel, the advantages of which are not only that the cooling of the filtering vessel that would follow on the introduction of cold water from some extraneous source is entirely avoided, (and this is a great advantage, as in many districts the filters are required to be washed out frequently during each day and the generating capacity of the boiler would be materially affected by the introduction of cold water from the filters,) but also because of the fact that hot chemically-treated water will more readily dissolve the deposits on the quartz-sand composing the filter-beds, whereas cold water would tend to fix the deposits and would therefore require to be passed through the filter much more violently than the hot water to effect a thorough cleaning.

Means are provided for reversing the direction of flow of the water through the filter-bed and for agitating the filtering material at the same time in order to clean out or discharge the sediment collected. As an improved construction for accomplishing this end a plurality of horizontally-disposed annular pipes $E^2$ are arranged at intervals throughout the height of the bed of filtering material, each provided at frequent intervals throughout its length with outlet-tubes $e^7$, arranged "porcupine" fashion. Each annular pipe is provided with an inlet-pipe $e^8$, extending out through the side wall of the filter and communicating with a riser $e^9$, which in turn communicates with the discharge-pipe $H^2$ through a pipe $e^{10}$. A supply-pipe L, connected with any suitable source of water-supply under pressure, communicates with the pipe $e^{10}$, cocks $e^{11}$, $e^{12}$, and $e^{13}$ being provided to control the several pipes to cause the water to enter the filter through the several drain-nozzles and annular agitating-pipes simultaneously. The water thus forced through the filter-bed passes out through the inlet-pipe H, which latter is provided with a branch discharge-pipe $H^3$, the latter being provided with a suitable cock $e^{14}$, whereby it may be closed except when cleaning the filter.

I claim as my invention—

1. In an apparatus for purifying water, the combination of a water-supply pipe, a filter connected thereto, a heating and precipitating apparatus interposed in the supply-pipe between the source of supply and the filter, means for introducing a chemical reagent in solution into the supply-pipe between the heating and precipitating apparatus and the filter, and a second heater interposed between the means for introducing the reagent and the filter, whereby the action of the reagent will be hastened and the water supplied to the filter made hot, substantially as and for the purpose set forth.

2. In a water-purifying apparatus, the combination with a source of water-supply and a filter through which said water is passed, of a tank for holding a chemical solution, a valved pipe discharging from said tank into the water passing to the filter, a chamber through which the water flows from the filter, a float in said chamber, and connections between said float and the valve of the valved passage, whereby the amount of valve-opening is automatically regulated in accordance with the specific gravity of the filtered water.

3. The combination with a water-purifying apparatus, of a graduated glass tube connected at both its upper and lower ends by valved passages, with the passage leading from the purifying apparatus and through which a portion of the water from the purifying apparatus normally flows when the valves are opened, an elevated burette connected with said tube by a valved passage, and cocks at the upper and lower ends of the tube, substantially as described.

4. In a water-purifying apparatus, the combination of a source of water-supply, a filter through which said water is passed, a tank for introducing a purifying substance into the water on its way to the filter, a valved passage discharging from said tank into the water, a chamber through which the water from the filter flows, a device in said chamber actuated by the variance in the specific gravity of the filtered water, and connections between this device and the valve of the valved passage whereby the amount of valve-opening is automatically regulated in accordance with the specific gravity of the filtered water.

In testimony that I claim the foregoing as my invention I affix my signature hereto, in the presence of two subscribing witnesses, this 2d day of November, A. D. 1898.

JAMES BOYD GREER.

Witnesses:
HENRY W. CARTER,
M. E. MARSH.